Nov. 12, 1929.  H. E. DEY  1,735,529
BRAKE FOR AUTOMOBILES AND OTHER VEHICLES
Filed Aug. 17, 1926  2 Sheets-Sheet 2

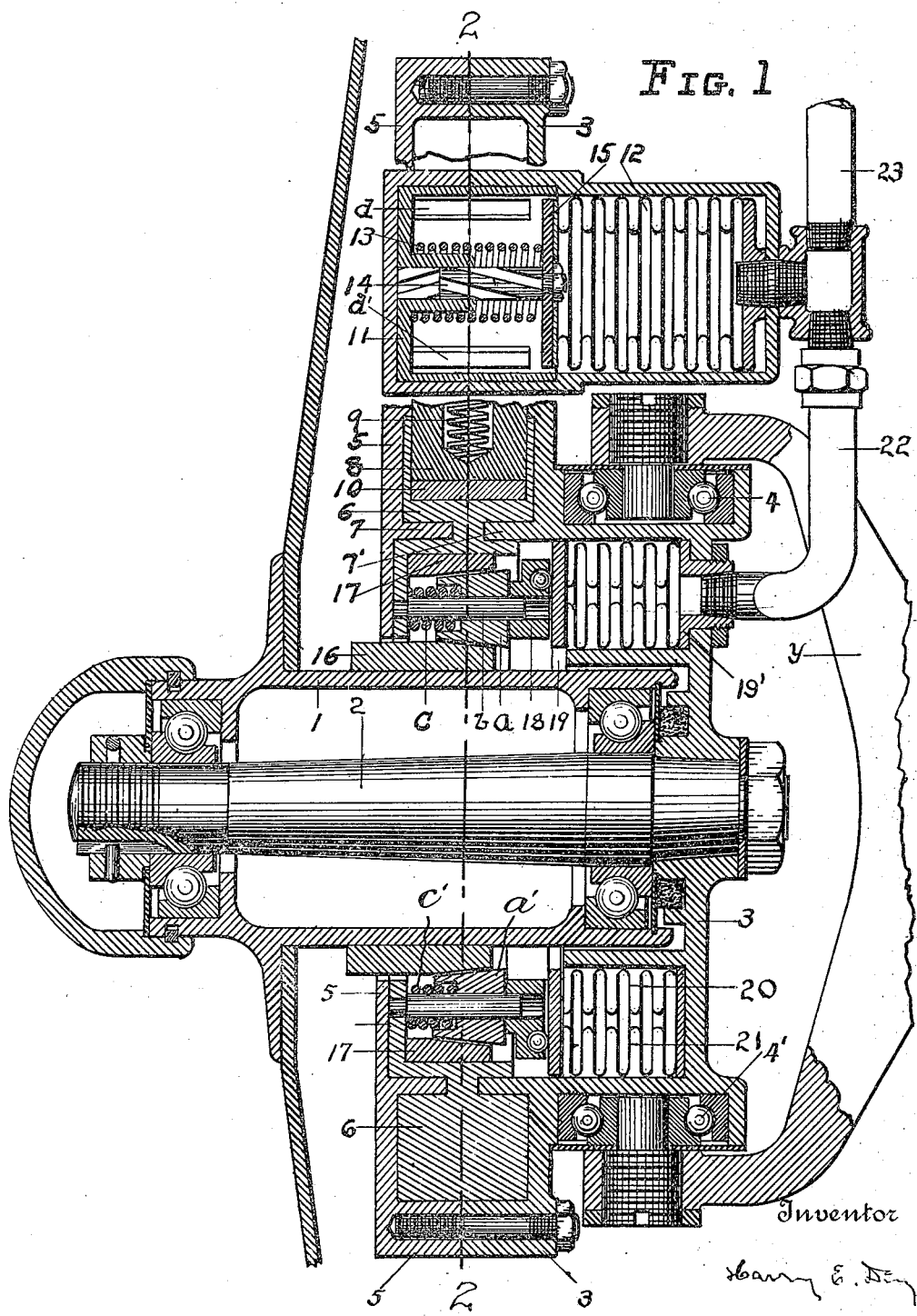

INVENTOR.

Patented Nov. 12, 1929

1,735,529

UNITED STATES PATENT OFFICE

HARRY EUGENE DEY, OF EAST ORANGE, NEW JERSEY; MARY E. DEY EXECUTRIX OF SAID HARRY E. DEY, DECEASED

BRAKE FOR AUTOMOBILES AND OTHER VEHICLES

Application filed August 17, 1926. Serial No. 129,771.

The object of this invention is to retard or stop automobiles and other moving vehicles, but it may be used in other types of machinery. It is based upon the well known retarding effect resulting from throttling the flow of a fluid from a pump operating through a closed circuit. There have been numerous inventions of this type patented, but to the best of my knowledge they have had a fault, common to all, of continuously operating the pump when the brake is not in action, and thus wasting considerable power through the friction of the pump elements. When braking the friction is an asset, but when not in action it is very objectionable. A feature of this invention is the means of avoiding this friction loss, by disconnecting the pump from the power transmitting unit when the brake is not in action.

Figure 2:
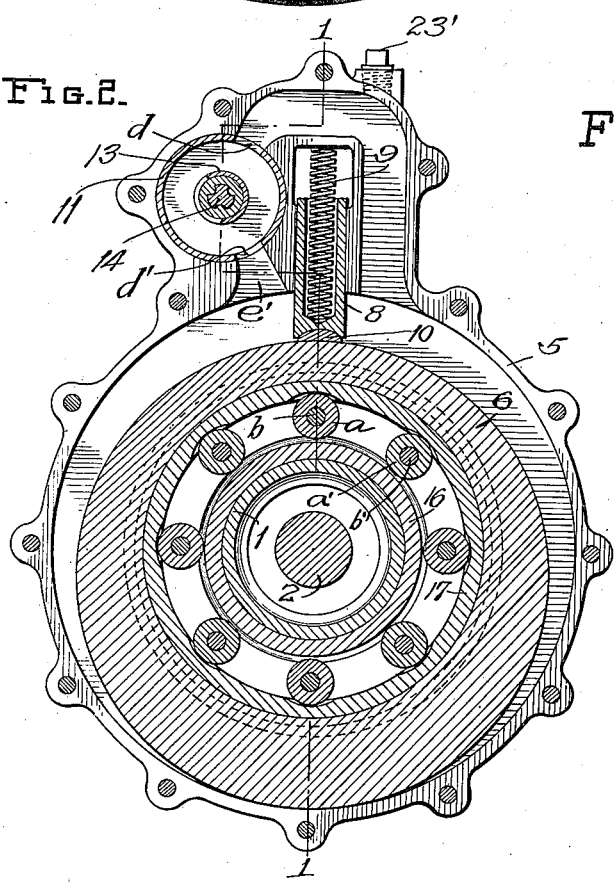

Referring to the accompanying drawings: Fig. 1 is a sectional view, on line 1—1. Fig. 2, of the brake mounted on the stub axle, inside one of the steering wheels of an automobile. Fig. 2 is a section taken at right angles to Fig. 1 on line 2—2. The stub axle is of the center steering type in which the king bolt has its axis at or near the vertical axis of the tire. This design is shown, as it involves one of the most difficult applications of the invention.

The hub of the wheel is represented by 1, and is mounted upon the stub axle 2; 3 is a casting that serves as one half of a casing for enclosing the operating parts of a rotary pump, and also carries the stub axle 2; and the ball bearings 4 and 4' of the axle yoke (y) trunnions. The other half of the pump casing is represented by 5; 6 is a disc eccentrically mounted on the internal cylindrical flanges 7 and 7' of the casings. A flat bar 8 having a reciprocating movement, is located in a pocket of the casings and bears against the eccentric disc by means of a spring 9, a rocking bar 10 providing a practically leak proof contact.

A rotary valve 11 is housed in the casings 3 and 4 adjacent to the reciprocating bar 8, and serves to open and close the passage e—e'. An extension of the valve housing encloses a copper bellows 12. It is similar in form to a Japanese lantern, and is a stock commercial article for other purposes. It has no working joints and consequently it is leak proof. The spiral threaded rod 14 is fixed to the bellows head 15, and receives a reciprocating motion as the bellows expands and contracts. It extends into the hub of the valve, which is threaded to match, and causes it to rotate and bring its openings $d$ and $d'$ in or out of line with the ports $e$ and $e'$.

Figure 3:
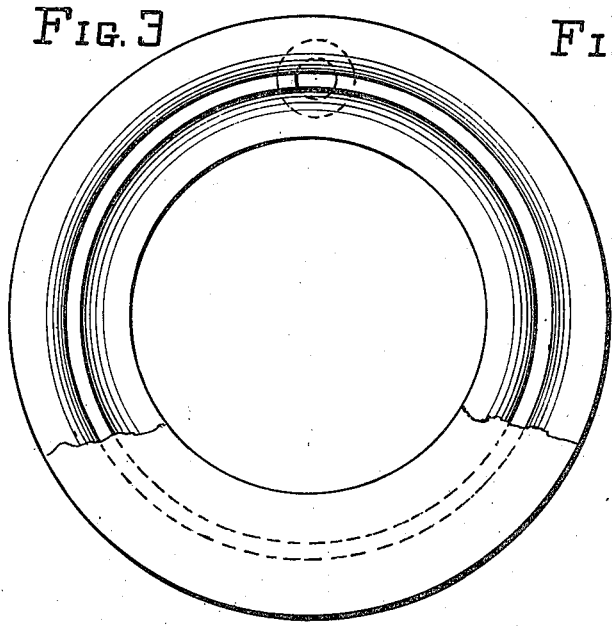
Figure 4:
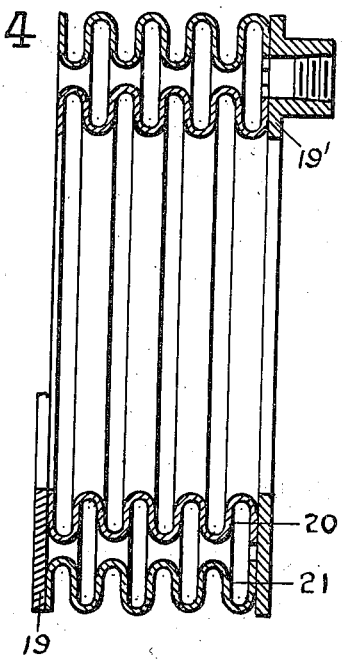

16 is a hardened metal coned ring rigidly sleeved upon the hub of the wheel 1. An internal cone, 17, is fixed in the eccentric casting 6, and is provided with tapered recesses in the coned surface into which the taper rollers $a$, $a'$ etc. enter. These rollers are rotatively mounted upon posts $b$, $b'$, etc. which are fixed to a ring which is an integral part of the eccentric disc casting 6. The ring, 18, is loosely mounted upon the other end of these posts, and serves as one member of a ball thrust bearing. The other member, 19, is the head of a bellows made in the form of a ring (Fig. 3 and Fig. 4) consisting of two corrugated cylinders similar to the one used for the valve control. These cylinders, 20 and 21, are made so that one may be enclosed in the other, one for the inside, and the other the outside of the ring, or bellows. A head shaped like a washer, is soldered to each end of the cylinders to join them. This bellows is housed in the casting 3, and is connected in parallel with bellows 12 by pipe 22.

Figure 5:
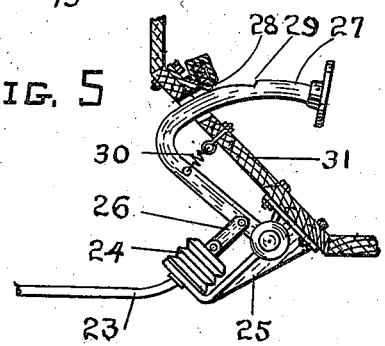

Fig. 5 is a sketch of a foot operated bellows mounted upon the toe board of the car. The bellows, 24, is similar to 12 and serves as a pump to force a fluid through the pipe 23 to bellows 12 and 20—21. It is mounted on the bracket 25 and connected to the foot pedal 27 by a link 26. A tension spring 30 connects the pedal to the toe board 31, and serves to return the parts to their normal position. 29 is a notch in the pedal arm designed to block the pedal movement when it strikes the pawl-like device 28, the location of which is such that the valve will be nearly closed. It is not a positive stop, however, for by increasing the foot pressure, the pawl will be forced back against its spring, allowing the pedal to pass, and the valve to be completely closed.

23' is a plug for filling the pump with fluid, and a similar plug, not shown, is located in the top of the bellows 24 for filling the control system.

It will be noted that the brake is divided into two hydraulic elements; one for doing the actual braking, and the other for controlling the brake action. For the working element a very heavy oil may be used, as fluid friction is not objectionable. It is an advantage rather than a disadvantage; and the heavy oil, or other fluid, will be easier to confine. The control element, however, should be quite the reverse, for the fluid friction should be kept as low as possible. Kerosene, for example, may be found to be a desirable liquid for the purpose. All the control parts being sealed tight there is no opportunity for leakage. Under certain conditions it may be found desirable to use compressed air from a tank in place of the bellows 24.

As shown on the drawings, the brakes are off. The tapered rollers a, a', etc. have been forced outward by the springs c, c', etc., so that they are out of contact with the coned rings 16 and 17, permitting the hub 1 to run freely. The valve 11 is turned to a position in which the openings coincide with the ports, permitting an unobstructed flow through the fluid circuit, 1' to 1, (L' to L).

When the foot pedal 27 is pressed, the compression of the bellows 24 forces the contained fluid through pipes 23 and 22, to bellows 12 and 20—21; bellows 12, expanding, forces the spiral threaded rod 14 into the internal threaded hub of valve 11, causing the valve to rotate in a direction to close the ports, the degree of closing depending upon the pressure applied to the pedal. Simultaneously, bellows 20—21 expands and forces the taper rollers into contact with the coned surface of ring 16 and the coned recesses of ring 17, and they immediately jam and lock the hub to the disc 6 in the manner common to roller clutches, and the disc then becomes the moving element of a rotary pump, having a fluid circuit through port e—e' and valve 11. As the valve 11 is turned, it gradually closes the ports to any degree desired, thus restricting the flow of the fluid, which causes a corresponding braking action upon the wheel. A complete closing of the valve locks the wheel against any turning movement. It is a well known fact, however, that locked wheels are not the most effective in stopping a car, the coefficient of friction between the tire and the ground being in that case much less. Absolute locking also causes skidding and injures the tires. To avoid these effects, I provide a notch 29 in the operating lever 27 at a point that will meet the pawl 28 before the valve 12 is completely closed. This will bring the wheel to a near stop, and when the car reaches a corresponding speed, an extra pressure on the pedal will cause the notch to pass the pawl and complete the closing of the valve, thus locking the wheel for an absolute stop.

The pressures per square inch in the clutch and valve bellows will, of course, be equal, but the clutch having a much larger area, will act first, and any additional pressure that it may receive, due to the requirements of the valve, will do no harm.

I do not limit myself to the construction shown in the drawings, as it is obvious that there are many types of pumps, clutches, etc. that I may adopt without departing from the spirit of my claims.

The following are some of the advantages of this brake:

It is as smooth and easy to operate as a throttle and acts throughout its full range of movement.

No brake bands or shoes to drag, wear, burn or squeal.

No adjustments required during the life of the car.

Because of no adjusting requirements, the foot, or other control lever, always retains its original normal position.

Absolutely free of friction drag when not in action.

Easy to equalize for equal or unequal pull.

Brake control and brake are two separate hydraulic elements.

Not affected by dirt or oil from other parts.

Control element is absolutely leakless.

Brake and power control can readily be combined in one lever.

It will stop a car in less distance than any other brake, because of the non-locking feature, and for the same reason will prevent skidding.

I claim:—

1. A brake, consisting of a pump operating through a closed circuit; a valve in said circuit; means for operating said valve by the pressure of a fluid; means for creating fluid pressure; a driving member; a clutch for connecting the driving member to the pump; and fluid pressure means for operating said clutch.

2. A hydraulic brake divided into two hydraulic elements; one element, for braking, consisting of a pump operating through a closed circuit; a throttle valve for said circuit, and a driving member; the other element, for controlling the braking action, comprising means for supplying pressure to a fluid; an expanding device, operated by said fluid pressure to operate the valve of the brake section; a clutch, also operated by an expanding fluid pressure device, for connecting the driving member to the pump.

3. A clutch, consisting of a cone shaped ring rigidly mounted on the driving member; a ring with concave tapered recesses at one end of the internal surface mounted in the driven member; a cage of tapered rollers attached to the driven member in a manner to permit the rollers to move into and out of engagement with the tapered surfaces of the two rings; and means for giving endwise motion to the rollers.

4. A clutch, consisting of a cone shaped ring rigidly mounted on the driving member; a ring with internal tapered recesses at one end of the internal surface, mounted in the driven member; tapered rollers rotatively mounted upon a ring of posts, which are fixed in the driven member; means to push the rollers endwise to contact with the coned surface of one ring and the tapered recesses of the other; and means for returning the rollers to their normal inactive position.

5. A clutch, consisting of a cone shaped ring mounted upon the driving member; a ring, with concave tapered recesses at one end of the internal surface, mounted in the driven member; tapered rollers rotatively mounted upon a ring of posts, which are fixed, concentrically with the axis of the rings, in the driven member; means of supplying pressure to a fluid; an expanding device, operated with said fluid pressure, to push the rollers endwise to contact with the coned surface of one ring and the tapered recess surfaces of the other ring; and means for returning the rollers to their normal non-contacting position.

6. A hydraulic brake divided into two hydraulic elements; one element, for braking, consisting of a pump operating through a closed circuit; a throttle valve for said circuit, and a driving member; the other element, for controlling the first element, comprising means for supplying pressure to a fluid; an expanding device, operated by fluid pressure, to control the throttle valve of the first element; a clutch consisting of a cone shaped ring mounted on the driving member; a ring with concave tapered recesses at one end of the internal surface, mounted in the driven member; a cage of tapered rollers attached to the driven member in a manner to permit the rollers to move into and out of engagement with the tapered surfaces of the two rings; and means for giving motion to the rollers.

7. A fluid brake comprising a pump operating thru a closed circuit, a valve in said circuit; fluid means for controlling said valve; a driving member; a clutch for connecting the pump to the driving member; fluid means for operating said clutch; and fluid means for jointly operating said fluid means provided to operate said clutch and said valve.

8. A brake, comprising a fluid pump operating thru a closed circuit; a valve in said circuit; means for controlling said valve; a driving member; a clutch for connecting the driving member to the pump, and fluid means for operating said clutch jointly with said valve.

HARRY EUGENE DEY.